United States Patent Office 3,629,172
Patented Dec. 21, 1971

3,629,172
ELASTOMERS FROM HIGH-VINYL CONJUGATED DIENE POLYMERS
Faber B. Jones, Bartlesville, Okla., assignor to Phillips Petroleum Company
No Drawing. Filed May 12, 1969, Ser. No. 823,973
Int. Cl. C08g 22/06
U.S. Cl. 260—23.7
13 Claims

ABSTRACT OF THE DISCLOSURE

Hydrogenation of high-vinyl telechelic polymers substantially reduces the number of olefinic double bonds and yet maintains a substantially liquid material. Terminating with isocyanate end groups and curing or coupling with polyfunctional agents results in novel products having high resistance to oxidation, weathering, and cracking.

---

This invention relates to the preparation of polymers. It further relates to the preparation of hydrogenated substantially liquid telechelic polymers. In another aspect it relates to the preparation of polymers resistant to oxidation and weathering.

The polyurethane products, either as sealants or as elastomers, in general exhibit high strength, excellent tear abrasion resistance, and good impact resistance at moderate temperatures. A number of different classes of polymers with reactive terminal groups have been used as precursors to the polyurethanes, such as the polyesters and polyethers. However, the polyester and polyether based polyurethane products have been particularly susceptible to weathering, including exposure to air, ozone, oxygen, and water. Stability has been poor under service conditions. Visible cracks have occurred after short weeks or months of service. Extensive breakdown attributable to hydrolytic degradation has been exhibited.

My invention virtually eliminates these difficulties by utilizing terminally active polymers, basically hydrocarbon in nature, as precursors to polyurethanes. Particularly of merit as precursors are the polybutadienes. The process of my invention utilizes a unique series of terminally functional liquid polymers of butadiene known as telechelic polymers.

An important feature of the particular telechelic polymers that I use is the high-vinyl content and correspondingly lower cis and trans unsaturation. The high-vinyl content provides a structure that, upon hydrogenation to remove unsaturation, results in highly alkyl-branched products which, most uniquely and significantly, are liquid. Hydrogenation of all usual butadiene based polymers affords materials structurally similar to the polyethylenes which are solid or waxy materials after hydrogenation.

Uniquely, hydrogenation of the high-vinyl telechelic polymers results in liquid products, even though the olefinic unsaturation has been substantially saturated. Subsequent conversion of these products together with suitable curing or coupling result in polymers of greatly increased resistance to accelerated weathering conditions. Further, these latter products are useful not only as elastomers and as sealants, but as coatings, molded articles, fibers, films, and the like.

Accordingly, it is an object of my invention to prepare substantially hydrogenated liquid polymers. It is a further object to provide telechelic polymers of block copolymer and random copolymer types prepared from conjugated diene monomers, and, if desired, with vinyl or vinylidene monomers as comonomers, which will respond to substantial hydrogenation by maintaining liquidity. It is a still further object to prepare useful, stable, degradation resistant polyurethanes from hydrogenated telechelic high-vinyl polymers. It is an additional object to provide cross-linked or coupled elastomers of improved resistance to weathering including oxidation and ozone attack. It is still an additional object to provide methods of preparation of the elastomers, polymers, and telechelic polymers referred to in the aforementioned objects.

Other aspects, objects, and several advantages of my invention will be apparent to one skilled in the art from the following description and appended claims.

I have found that telechelic polymers of high-vinyl content can be hydrogenated to substantially decrease the number of their olefinic double bonds, and yet maintain a substantially liquid physical condition. Further, that after reacting with a suitable diisocyanate, they yield liquid, highly alkyl-branched isocyanate terminated polymers. These isocyanate terminated polymers can be cured or coupled with various coupling or curing agents, such as polyols, to provide highly stable deterioration resistant materials. These telechelic polymers can be prepared by polymerizing a conjugated diene, either alone or with copolymerizable monomers, employing a dilithium initiator, to a suitable molecular weight, and terminating to produce polymers with terminally active groups.

The telechelic polymers of my invention can be represented by Z—Y—Z where Z represents the reactive end groups, and Y is a divalent, substantially-linear, highly vinyl-branched, polymeric radical. Such telechelic polymers are polymers of vinylidene-containing monomers and have a reactive group situated on each end of the polymer chain. Expressed in another way, the telechelic polymers contain effectively two terminal reactive groups per molecule. At least about 70 percent of the divalent chain units are derived from a conjugated diene, and the remainder of the units, if any, are derived from a copolymerizable monomer containing either a vinyl or vinylidene radical.

At least about 40 percent of the chain units have a vinyl radical as follows:

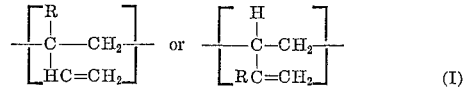
(I)

At least about 40 percent of the monomer is incorporated into the polymer molecule in a manner such that vinyl (—CH=CH$_2$) or vinylidene

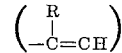

radicals are attached to carbon atoms of the polymer.

R in the above structures (I) can be hydrogen, chlorine, fluorine, bromine, or a radical such as alkyl, alkoxy, alkoxyalkyl, or the like containing from 1 to about 8 carbon atoms, inclusive. Of course, the above formulas are the same when R=H. The other chain units of the divalent polymeric radical which are also derived from conjugated dienes can be represented:

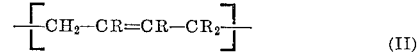
(II)

wherein R is as described above. In essence, at least 70 percent of the divalent polymeric chain units are of the type represented by the above structures, I and II.

The telechelic polymers according to the presently preferred embodiment of my invention have particular characteristics: the reactive end groups are preferably hydroxy or hydroxyethyl, though other groups are useful as hereinafter listed. The molecular weight range is about 200 to about 100,000, preferably 500-20,000, more preferably 500-10,000; liquid at room temperature; at least about 40 percent of the total divalent polymeric chain units are of the type represented by structures (I), i.e., they have a vinyl or vinylidene branch, preferably 50 percent or more of the total units are of the type represented by structures (I).

According to my invention, the telechelic high-vinyl polymers as described are hydrogenated to the extent that at least about 70 percent of their olefinic linkages are saturated. Hydrogenation of the telechelic polymers can be effected by any means known to the art to be useful for the hydrogenation of olefinic double bonds.

After hydrogenation, the hydrogenated highly alkyl-branched telechelic polymers (telechelic, i.e., containing reactive end groups) are reacted with substantially an equivalent amount of a diisocyanate, preferably in the presence of a non-deleterious diluent. Sufficient isocyanate radicals should be used so as to provide approximately two isocyanate radicals for each terminal radical of the telechelic polymers, i.e., about 18 to about 22 isocyanate radicals should be added for each 10 reactive end groups of the telechelic polymers. Preferably, the amount of diisocyanate used is approximately equivalent to the functional groups on the telechelic polymer. If desired, the thus-formed polymers can be separated by any suitable separation means known to the art for separation of organic polymers, such as by stripping volatile materials from the polymers.

The surprising and important aspect of these hydrogenated high-vinyl polymers is that they do not substantially solidify through each of the steps. This is unexpected since low-vinyl polymers solidify to a substantial degree upon hydrogenation, and such solidified polymers are not suitable for use in room temperature castable sealant formulations and the like.

The isocyanate terminated polymers prepared from the hydrogenated polymers (or prepolymers as often termed) can then be cured or coupled by means of any suitable polyfunctional curing or coupling agent to produce novel elastomeric compositions. Such elastomers can be employed by any means known to the art for the employment of similar unhydrogenated materials in the formulation of sealants, adhesives, molding compositions and the like. For instance, the curing or coupling agent and the isocyanate terminated polymer can be blended with resins, pigments, reinforcing agents, extenders, diluents, or the like, and can be applied to seal cracks, etc., preferably where a high performance sealant is required, or can be molded and/or fabricated into various useful articles, elastomeric fibers, etc. High temperatures need not be employed to effect cure. The cured or coupled elastomer is surprisingly resistant to environment determioration.

The value and operability of my invention are demonstrated by the following examples.

EXAMPLE I

A liquid high-vinyl hydroxy-terminated telechelic butadiene polymer was prepared having a hydroxyl content of 0.91 meq. (milliequivalents) of hydroxy group (—OH) per g. (gram) of polymer [1], a microstructure having 89.1 percent vinyl groups [2], and a molecular weight of 1310 as determined by vapor pressure osmosis [3].

A portion of the liquid high-vinyl hydroxy-terminated telechelic polymer was terminated with a diisocyanate. To a stirred reactor were charged 300 g. (0.273 equivalents based on equivalent weight from the polymer hydroxy content, 1100 g./mole) of the hydroxy-terminated telechelic polymer, 52.3 g. of 2,4-tolylene diisocyanate (a 10 percent equivalent excess), and 300 g. of toluene, all under nitrogen. The reactor contents were maintained at 80° C. for four hours. Volatiles were stripped to a constant weight. The isocyanate terminated polymer was recovered as a viscous, light amber tinted, clear fluid in substantially 100 percent of the theoretical yield. Vapor pressure osmosis measurement indicated a molecular weight of 1610 [3]. Total nitrogen content was 2.4 weight percent [4]. Free isocyanate radical content was 0.90 meq. per g.[5]. This isocyanate terminated polymer prepared from nonhydrogenated high-vinyl telechelic butadiene polymer was designated Prepolymer 1 and was employed in Control Runs 2, 4, and 6 in Table I.

Another portion of the liquid high-vinyl hydroxy-terminated telechelic butadiene polymer was hydrogenated. To a stirred reactor were charged 144 g. of the hydroxy-terminated telechelic polymer that had previously been washed repeatedly with hot methanol and stripped of volatiles, 25 g. of Raney nickel catalyst, and 325 ml. of isopropanol. Hydrogen was pressured to the reactor at a constant pressure of 1000 p.s.i.g., and temperature was maintained at 75–80° C. for four hours. The liquid product was filtered to remove the catalyst. Volatiles were stripped to constant weight. Infrared analysis indicated a reduction of over 95 percent of the vinyl unsaturation [2] and of over 90 percent of the total olefinic unsaturation [2] of the telechelic polymer.

The hydrogenated liquid highly alkyl-branched hydroxy-terminated butadiene polymer was then reacted with 2,4-tolylene diisocyanate as described hereinbefore, and a light tan, clear, viscous, fluid product was recovered. Analysis by vapor pressure osmosis [3] indicated a molecular weight of 1575 g./mole, a total nitrogen content of 2.4 percent by weight [4], and a free isocyanate radical content of 0.87 meq. per g.[5]. These values are noted to be quite similar to those obtained for Prepolymer 1. The isocyanate terminated polymer prepared from hydrogenated liquid telechelic butadiene polymer was designated Prepolymer 2 and was employed in Runs 1, 3, and 5 in Table I.

A low-vinyl hydroxy-terminated telechelic butadiene polymer was prepared having a molecular weight of 3050 g./mole (as determined by vapor pressure osmosis) [3], a microstructure having 26 perecent vinyl groups [2], and a hydroxyl content of 0.88 meq./g.[1]. Using the molecular weight as determined by vapor pressure osmosis and a ratio of 2 hydroxyl groups per molecule to calculate the amount of isocyanate to be employed, the low-vinyl hydroxy-terminated butadiene polymer was reacted with 2,4-tolylene diisocyanate. To a stirred reactor were charged 34.8 g. (10 percent equivalent excess) of 2,4-tolylene diisocyanate and 300 g. of toluene under nitrogen. A total of 300 g. of the polymer was added incrementally over 30 minutes, the reactor temperature being maintained at 80° C. The reaction was continued for two additional hours. Volatiles were stripped under vacuum to constant weight. A yield of 332 g. (99 percent of theoretical) of a viscous fluid having a light amber tint was recovered. Vapor pressure osmotic analysis indicated a molecular weight of 2100 [3]. Nitrogen content was 1.20 percent by weight [4] (theoretical, 1.65 percent). Free isocyanate content was 0.28 meq. per g.[5]. This isocyanate terminated low-vinyl butadiene polymer was designated Prepolymer 3, and was employed in Control Run 7 in Table I.

Prepolymers 1, 2, and 3 were cured in sealant formulations with glycerine (a polyol) as the curing agent, and the sealant properties tested with results as shown in Table I. The data of Table I clearly demonstrate that the sealants prepared with the novel polyurethane polymers of this invention (Runs 1, 3, and 5 using the hydrogenated Prepolymer 2) exhibited remarkably improved resistance to surface cracking, hardening, loss of elongation, and loss of tensile strength after 1000 hours exposure to weatherometer testing, as compared to analogous sealants formulated with conventional nonhydrogenated polyurethane polymers (Control Runs 2, 4, and 6 using nonhydrogenated Prepolymer 1). Properties of polymers using the hydrogenated prepolymers in absolute terms before weathering are also quite good. The definite improvement in absolute physical properties of sealants formulated of the novel isocyanate terminated polymers of this invention, as exemplified by Run 1, in comparison to sealants formulated of conventional isocyanate terminated polymers, exemplified by Control Runs 2 and 7, is also clearly demonstrated by the data of Table I.

See footnotes at end of Example 4.

TABLE I.—PROPERTIES OF SEALANTS FROM POLYBUTADIENE DIISOCYANATES

|  | Run 1 | Control 2 | Run 3 | Control 4 | Run 5 | Control 6 | Control 7 |
|---|---|---|---|---|---|---|---|
| Formulation:[11] |  |  |  |  |  |  |  |
| Prepolymer 1[12] | 100 |  | 100 |  | 100 |  |  |
| Prepolymer 2[13] |  | 100 |  | 100 |  | 100 |  |
| Prepolymer 3[14] |  |  |  |  |  |  | 100. |
| Extender oil: |  |  |  |  |  |  |  |
| Necton 60[7] |  |  | 50 | 50 |  |  |  |
| Circosol 42XH[8] |  |  |  |  | 50 | 50 |  |
| Glycerine | 3.72 | 3.72 | 3.72 | 3.72 | 3.72 | 3.72 | 1.41 |
| (Dimethylamino) ethanol | 0.30 | 0.30 | 0.30 | 0.30 | 0.30 | 0.30 | 0.53 |
| Sealant properties: |  |  |  |  |  |  |  |
| Gel time, room temp., hrs | 1-2 | 1-2 | 6 | 6 | 6 | 6 | 1-2 |
| Time to reach max. strength at room temperature | 7-9 days | 15-18 hrs | 7-9 days | 24-28 hrs | 7-9 days | 7-9 days | 15-18 hrs |
| Tensile strength[15] | 519 | 320 | 331 | 375 | 256 | 411 | 128 |
| Elongation percent[16] | 240 | 390 | 216 | 280 | 212 | 283 | 1400 |
| Hardness, Shore A[17] | 62 | 50 | 48 | 50 | 46 | 50 | 30 |
| Retention after 1000 hrs. in Weatherometer:[18] |  |  |  |  |  |  |  |
| Tensile, percent retained | 105 | 106 | 62 | 49 | 92 | 61 | 56.[20] |
| Elongation, percent retained | 80 | 53 | 81 | 29 | 86 | 44 | 30.[20] |
| Hardness, percent retained | 108 | 166 | 104 | 134 | 113 | 134 | 160.[20] |
| Surface cracking[19] | None | Severe | None | Severe | None | Severe | Severe.[20] |

See footnotes at end of Example 4.

EXAMPLE II

Viscosities of the sealant formulations prepared from hydrogenated isocyanate-capped Prepolymer 2 were determined to be 42,000 cps. and 86,000 cps.[6], respectively, when Necton 60[7] and Circosol 42XH[8], respectively, were employed as extenders. This compares favorably with viscosities favored by the art, such as in a commercial product such as Thiokol LP-2[9] (63,000 cps.) and Thiokol LP-32[10] (37,000 cps.). This example demonstrates that the viscosities of exemplary sealant formulations of the novel polymers of this invention are within the range considered desirable by the art.

EXAMPLE III

A portion of low-vinyl hydroxy-terminated telechelic butadiene polymer employed as a precursor to Prepolymer 3 of Control Run 7 of Example I was hydrogenated in the same manner as was the high-vinyl hydroxy-terminated telechelic butadiene polymer employed as a precursor to Prepolymer 2 of Runs 1, 3, and 5 of Example I. However, upon hydrogenation, the low-vinyl polymer solidified to such an extent that it could not readily be employed in sealant formulations.

This example demonstrates that low-vinyl telechelic butadiene polymers cannot be hydrogenated and cured to elastomers satisfactorily according to the process of this invention.

EXAMPLE IV

The following additional data demonstrate that hydrogenation of hydroxy-terminated high-vinyl conjugated diene polymers does not significantly increase the viscosity of such polymers; but, in fact, often decreases the viscosity of the polymers. This surprising result is contrasted to a control run with a low-vinyl hydroxy-terminated conjugated diene polymer of otherwise similar type which demonstrates the normally expected result of hydrogenation of such polymers, i.e., considerable increase in viscosity upon hydrogenation, indeed, substantial solidification.

Three hydroxy-terminated telechelic butadiene polymers were prepared having properties as noted in Table II, following. These polymers, which were prepared in cyclohexane solution employing an organo-di-lithium promoter with subsequent conversion of the lithium-terminated polymer to the hydroxy-terminated polymer by reaction with ethylene oxide, were each washed with water to remove catalyst residue while still in cyclohexane solution. The cyclohexane solutions of the polymers were dried and concentrated to 20 percent solutions (weight of polymer per volume of solution) prior to addition of hydrogenation catalysts.

Hydrogenation was effected by mixing 10 g. portions of a nickel-on-kieselguhr catalyst with 500 ml. portions of each of the 20 percent concentrates of polymers in cyclohexane, stripping the cyclohexane from the polymer, and hydrogenating (100 p.s.i.g. $H_2$ for 15 minutes at 75° F., 500 p.s.i.g. $H_2$ for 5 hours or more at 25° F.). No more than 5 percent unsaturation remained in the polymer of any run after hydrogenation.

Viscosities were determined on stripped polymers.

TABLE II

| Polymer No. | Vinyl content[2] percent | Mole wt.[21] | Viscosity[22] unhydrogenated, cps. | Viscosity[23] hydrogenated, cps. |
|---|---|---|---|---|
| 8 | 82 | 1,900 | 1,948,000 | 258,000 |
| 9 | 52 | 2,600 | 86,000 | 36,000 |
| 10 | 34 | 2,400 | 39,000 | >1,200,000 |

[1] Determined by reaction with acetic anhydride, hydrolysis of unreacted acetic anhydride, and titration of released acetic acid with standard base.
[2] Infrared analysis. Refer U.S. 3,157,604, column 8, lines 34-65.
[3] Vapor pressure osmosis method comprises measuring temperature differential caused by migration of solvent from vessel of solvent to vessel of solution of polymer under standardized conditions. (Molecular weight of polymers having polar end groups can only be approximately determined by ordinary vapor pressure osmosis because of varying end group association, and the values obtained thereby should only be regarded as indicating a general approximation.)
[4] By modified Dumas method with gas chromatography of tailings.
[5] Reaction with dibutyl amine and titration of excess reagent with standard acid, Siggia, 3rd edition, p. 599.
[6] Bulk viscosities were measured with a Brookfield Viscosimeter, Model RVT-E.
[7] Necton 60 is a trademark for an aliphatic type rubber extender oil supplied by Humble Oil Co.
[8] Circosol 42XH is a trademark for a naphthenic type rubber extender oil supplied by Sun Oil Co.
[9] Thiokol LP-2 is a polysulfide sealant product of Thiokol Co.
[10] Thiokol LP-32 is a polysulfide sealant product of Thiokol Co.
[11] All values under Formulation are parts by weight.
[12] Prepolymer 1—an isocyanate terminated high-vinyl polybutadiene (non-hydrogenated).
[13] Prepolymer 2—a hydrogenated isocyanate terminated high-vinyl polybutadiene.
[14] Prepolymer 3—an isocyanate terminated low-vinyl polybutadiene (non-hydrogenated).
[15] Tensile strength—determined using die cut cured samples ¼ inch x ½ inch thick with an Instron Universal Testing Machine, Model TT, at a crosshead speed of 20 in./min.
[16] Elongation—determined using die cut cured samples ¼ inch x ¼ inch thick with an Instron Universal Testing Machine, Model TT, at a crosshead speed of 20 in./min.
[17] Hardness, Shore A—a penetration hardness test.
[18] Weatherometer exposure was in an Atlas Weatherometer with an xenon arc light source under conditions of continuous illumination at 130-140° F. and 40-50 percent humidity.
[19] Surface cracking—by visual observation.
[20] Data after only 300 hours exposure.
[21] Molecular weight by vapor pressure osmosis was determined for the respective non-terminal-functional analogues which were prepared by reaction of the lithium-terminated polymers with isopropanol rather than ethylene oxide.
[22] Brookfield Viscosimeter viscosities of polymers per se, see note 6, at 24° C.
[23] This material, almost a solid at 24° C., was so highly viscous that the Brookfield instrument value is probably much too low.

See footnotes at end of Example 4.

Referring to structures (I) and (II) given hereinbefore as representing at least 70 percent of the divalent polymeric chain units or our telechelic polymers, examples of monomers from which such polymeric units preferably can be derived, and in which R is alkyl or H, include 1,3-butadiene, isoprene, 2,3-dimethyl-1,3-butadiene, 1,3-pentadiene (piperylene), 3-methyl-1,3-pentadiene, 1,3-heptadiene, 3-butyl-1,3-octadiene, phenyl-1,3-butadiene, and the like. If desired, conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxymethyl-1,3-hexadiene, in which case R is a halide such as chlorine, fluorine, or bromine, or is a radical such as alkoxy, alkoxyalkyl, or the like containing as many as 8 carbon atoms as well as H and alkyl. Such conjugated dienes can be polymerized alone or admixture with each other to form random copolymers or block copolymers by means well known to the art.

Such conjugated dienes can also be copolymerized with monomers copolymerizable therewith containing either a vinyl or vinylidene radical, and such monomers can be employed in sufficient amounts to provide polymeric chain units up to about 30 percent of the total polymer units by means well known to the art. Such vinylidene monomers include the vinyl substituted aromatic compounds such as styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of aromatic monomers include 3-methylstyrene,
4-n-propylstyrene,
4-dodecylstyrene,
3-cyclohexylstyrene,
2-ethyl-4-benzylstyrene,
4-p-tolystyrene,
4-(4-phenyl-n-butyl)styrene,
4-methoxystyrene,
3,5-diphenoxystyrene,
4-(dimethylamino)styrene,
4-methoxy-6-(di-n-propylamino)styrene,
4,5-dimethyl-1-vinylnaphthalene,
8-phenyl-1-vinylnaphthalene,
4-methoxy-1-vinylnaphthalene,
3,6-(dimethylamino)-1-vinylnaphthalene, and the like. These vinyl-substituted aromatic compounds can be used to form copolymers with the conjugated dienes by means well known to the art.

Certain polar vinylidene compounds can also be employed as comonomers. Such polar monomers include the vinylpyridines and vinylquinolines, in which the vinyl group is attached to a ring carbon atom. These pyridine, quinoline, or isoquinoline derivatives can contain substituents such as alkyl, cycloalkyl, aryl, alkaryl, aralkyl, alkoxy, aryloxy, and dialkylamino groups in which the total number of carbon atoms in the combined substituents does not exceed about 12. Any alkyl groups on the alpha or gamma carbons with respect to nitrogen should be tertiary alkyl groups. Examples of polar monomers applicable include:

2-vinylpyridine,
3,5-diethyl-4-vinylpyridine,
3-n-dodecyl-2-vinylpyridine,
2-methyl-5-vinylpyridine,
5-cyclohexyl-2-vinylpyridine,
4-phenyl-2-vinylpyridine,
3-benzyl-4-vinylpyridine,
6-methoxy-2-vinylpyridine,
4-phenoxy-2-vinylpyridine,
4-dimethylamino-2-vinylpyridine,
2-vinylquinoline,
3-methyl-4-ethyloxy-2-vinylquinoline,
3-vinylisoquinoline,
4-phenyl-1-vinylisoquinoline, and the like.

Other suitable polar monomers include the acrylic and alkacrylic acid esters, nitriles, and N,N-disubstituted amides such as methyl acrylate, ethyl acrylate, butyl acrylate, methyl methacrylate, ethyl methacrylate, propyl methacrylate, butyl methacrylate, methyl ethacrylate, isopropyl ethacrylate, acrylonitrile, methacrylonitrile, N,N-dimethyl acrylamide, N,N'-diethyl methacrylamide, and the like. Vinylfuran and N-vinylcarbazole can also be used.

The reactive end groups, Z on the telechelic polymers Z—Y—Z, can be any group known to the art such as —SH,

—SO$_3$H, —C$_6$H$_3$OH$_2$, —OH, —CH$_2$—CH$_2$—OH, phosphinate, thiophosphinate, —SO$_2$H, —SOH, $$-\overset{\overset{O}{\|}}{C}-OH$$

—SeO$_2$H, —SiO$_2$H, —SnO$_2$H, —SbOH, —TeO$_2$H, —AsO$_2$H, and the like that is known to react with an isocyanate group. The telechelic polymers can be synthesized by any means known to the art. United States Letters Patent 3,084,141, 3,135,716, 3,175,997, and 3,177,190 are a few examples of patents that disclose means of preparing such telechelic polymers.

A useful method for making liquid high-vinyl telechelic polymers from conjugated dienes is described in copending application Ser. No. 700,691 filed Jan. 19, 1968, now abandoned. This method comprises introducing a conjugated diene monomer of 4 to 8 carbon atoms into a polar solvent or diluent containing an alkali metal or organoalkali metal initiator. The polar solvent or diluent should be one which does not inactivate the catalyst contained therein. Ethers, thioethers, and tertiary amines containing 2 to 12 carbon atoms are suitable. These polar solvents or diluents can be used alone, or in admixture with conventional hydrocarbon solvents including paraffins and aromatic hydrocarbons of up to about 8 carbon atoms. The amount of polar solvent used can vary, though at least 3 volume percent of the diluent mixture, and more preferably approaching 100 percent should be employed.

Terminally reactive polymers can be prepared by polymerizing the above-named monomers in the presence of an organo-alkali metal compound or an alkali metal such as sodium, potassium, lithium, rubidium, or cesium. The organo-alkali metal compound can be the type represented by the formula AM$_2$ wherein A is a radical that contains up to and including 30 carbon atoms selected from the group consisting of alkyl, cycloalkyl, aryl, or combinations thereof such as aralkyl, alkaryl, and the like; M is an alkali metal selected from the group consisting of sodium, potassium, lithium, rubidium, cesium, and the like. Examples of such compounds include 1,2-dilithio-1,2-diphenylethane, 1,2-disodio-1,2-diphenylethane, dilithionaphathalene, 1,4-dilithiobutane, 1,4-dilithio-2,3-dimethylbutane, 1,3-dilithiobenzene, and the like. Polymerization with a lithium containing compound is preferred.

The polymerization process described above can be carried out at any temperature within the range of about —100 to +150° C., but operation in the range of —75 to +75° C. is preferred. The polymerization reaction can be carried out under autogeneous pressures. It is usually desirable to operate at pressures sufficient to maintain the monomeric materials substantially completely in the liquid phase. The pressure to be employed will thus depend upon the conjugated diene, the diluent, and the reaction temperature. Pressures in the range of about 0.5 to about 20 atmospheres can be employed. These pressures are obtained by any suitable method such as by pressurization of the reactor with a gas which is inert to the reaction system.

The amount of the organo-alkali metal which is employed as initiator in the polymerization can vary over a wide range and can be used to control the molecular weight of the polymer. As the initiator level increases, the molecular weight of the polymer decreases. In general, the amount of alkali metal or organo-alkali metal initiator is maintained within the range of 5 to 10,000 gram millimoles per 100 grams of monomeric material being polymerized and preferably in the range of 10 to 5,000 gram millimoles per 100 grams of monomer.

The liquid high-vinyl telechelic polymers can be hydrogenated by any means known to the art to be useful for the hydrogenation of olefinic double bond linkages. General methods of hydrogenation are disclosed by United States Letters Patent 2,693,461 and 2,864,809. A particularly convenient process for hydrogenation comprises contacting our liquid high-vinyl telechelic polymers with Raney nickel catalysts and hydrogen at pressures in the range of about atmospheric to 3000 p.s.i.g., preferably 100–1000 p.s.i.g., at temperatures in the range of 75° F. to the degradation temperature of the polymer, i.e., to as high as 1000° F., though preferably in the range of about 200–600° F., for a sufficient time to reduce at least about 70 percent of the olefinic linkages. Generally, in the range of 0.5 to 50 grams of Raney nickel catalyst can be employed for each 100 grams of polymer.

The diisocyanates employed for isocyanate termination of the hydrogenated liquid highly alkyl-branched telechelic polymers per my invention can be any diisocyanate normally known to be reactable with and useful to couple reactive-group-terminated polymers. Such diisocyanates can be represented as $R'(-NCO)_2$ where $R'$ is an organic radical of a valence of 2, that can contain in the range of 2 to 20 carbon atoms and can also contain as many as 8 atoms of any of chlorine, fluorine, bromine, oxygen, nitrogen, and sulfur, provided that such atoms are not bonded to hydrogen or each other. Examples of such suitable diisocyanates include 2,4-tolylene diisocyanate, 3,4-tolylene diisocyanate, 1,3-trimethylene diisocyanate, 2,6-tolylene diisocyanate, 4,4'-diphenylmethane diisocyanate, o-, m-, and p-xylylene diisocyanates, 1,6-hexane diisocyanate, 1,12-dodecane diisocyanate, 1,20-eicosane diisocyanate, 2,6 - anthracene diisocyanate, 2,5-pyridine diisocyanate, 3,4-tetrahydropyran diisocyanate, 3,5-indane diisocyanate, 1,5-naphthalene diisocyanate, 1,3-phenylene diisocyanate, and the like.

The isocyanate termination step is most conveniently effected in the presence of a suitable non-deleterious diluent, the diluents include materials such as dimethyl sulfoxide, the xylenes, 3-hexyl-4-chlorotetrahydropyran, toluene, hexane, cyclohexane, and the like. Any diluent that does not substantially react with an isocyanate group under the environment involved and that is a solvent or cosolvent for the polymer is suitable. Such diluents can be employed in any desired amount, preferably in the range of about 20 to about 90 percent by weight of the total mixture.

The isocyanate terminated hydrogenated liquid polymers can then be cured or coupled with a suitable polyfunctional curing or coupling agent. These polyfunctional curing or coupling agents include any compound having two or more labile hydrogen atoms per molecule that are known to react with an isocyanate function. Such compounds can be represented by $R'(Y')_n$ wherein $R'$ is as described above for diisocyanates except that the valence can be $n$, which is an integer of from 2 to 6, inclusive, and wherein $Y'$ is a group having a labile hydrogen known to react with an isocyanate function. Such groups include —OH, —SH,

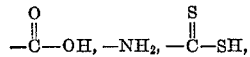

—$SO_3H$, —$C_6H_3(OH)_2$, —$SO_2H$, —SOH, —$SeO_2H$, —$SiO_2H$, —$SnO_2H$, —SbOH, —$TeO_2H$, —$AsO_2H$, and the like. Examples include polyols such as glycerine, ethylene glycol, 1,3-propylene glycol, pentaerythritol, pentaerythritol tetra(3-mercaptopropionate), 1,3,7-hexanetriol, fructose, mannitol, 1,2,5-pentanetriol, 1,3,5,10,12,14-eicosanehexol, 2,6-dihydroxytetrahydropyran, 3,5-dihydroxypyridine, 2,6-dimercaptopyridine, 4-chloro-2,6-dihydroxytetrahydropyran, 3,4-dimercaptothiophene ethylenediamine, terephthalic acid, isophthalic acid, benzene-1,3,5-tricarboxylic acid, p-phenylenediamine, benzidine, diethylenetriamine, triethylenetetramine, 1,6-hexanedicarboxylic acid, 1,4-cyclooctanedicarboxylic acid, 4-aminohexanoic acid, 5-hydroxypentanoic acid, 3-mercaptopropionic acid, 1,4-benzenedisulfonic acid, 2,6-naphthalenedisulfonic acid, 2,6-naphthalenedisulfinic acid, 1,10-decanediarsinic acid, 2,6-naphthaleneditellurinic acd, and the like; the polyols described are presently preferred.

The curing or coupling of formulations containing a curing or coupling agent plus the isocyanate terminated hydrogenated highly alkyl-branched polymer of my invention can be effected at temperatures in the range of —20° C. to about 200° C. Preferably such curing or coupling is effected in the range of about —10° C. to about 40° C.

Suitable catalysts can be employed to promote the curing or coupling. For example, compounds such as (dimethylamino)ethanol, dibutyl tin dilaurate, diazobicyclooctane, stannous acetate, stannous octanoate, lead propionate, antimony stearate, and the like can be employed in amounts in the range of about 0.001 to about 5 weight percent of the weight of the isocyanate-capped polymer. Preferably such catalysts are employed in the range of about 0.25 to 2 percent.

Reasonable variations and modifications are possible within the scope of this disclosure without departing from the scope and spirit thereof.

That which is claimed is:

1. A method of producing liquid hydrogenated polymers which comprises:

(a) polymerizing a first monomer consisting of a conjugated diene, and from 0 to 30 weight percent of a second monomer copolymerizable therewith and containing at least one active radical selected from the group consisting of vinyl and vinylidene, in the presence of from 5 to 10,000 gram-millimoles per 100 grams of said monomers of a dilithium initiator under polymerization conditions at a temperature of from —100 to +150° C. and a pressure of from 0.5 to 20 atmospheres, thereby producing a liquid high-vinyl telechelic polymer with a molecular weight from about 200 to about 100,000 wherein at least 40 percent of the polymer chain units have a vinyl radical, and wherein the telechelic functions of said polymer consist of a group on each end of the polymer group reactable with an organo diisocyanate $R(NCO)_2$ wherein R has a valence of 2 and contains from 3 to 20 carbon atoms, wherein the said telechelic functions of said polymer are selected from the group consisting of —SH,

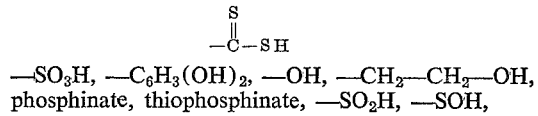

—$SO_3H$, —$C_6H_3(OH)_2$, —OH, —$CH_2$—$CH_2$—OH, phosphinate, thiophosphinate, —$SO_2H$, —SOH,

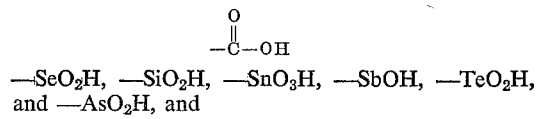

—$SeO_2H$, —$SiO_2H$, —$SnO_3H$, —SbOH, —$TeO_2H$, and —$AsO_2H$, and (b) hydrogenating at least 70 percent of the olefinic double bonds of said liquid high-vinyl telechelic polymer and thereby producing a hydrogenated liquid highly alkyl-branched telechelic polymer.

2. The hydrogenated liquid highly alkyl-branched telechelic polymers prepared by the process of claim 1.

3. The method of claim 1 wherein said step (b) is followed by:

(c) reacting said hydrogenated liquid highly alkyl-branched telechelic polymer with at least one said organo diisocyanate and thereby producing an isocyanate terminated polymer, (d) curing said isocyanate terminated polymer from said step (c) at a temperature of from about −20° C. to +200° C. with at least one polyfunctional curing agent $R'Y'_n$ wherein $R'$ has a valence of $n$ and contains from 2 to 20 carbon atoms, $n$ is an integer of from 2 to 6, and $Y'$ is a group having a labile hydrogen reactive with an isocyanate group, and wherein Y is selected from the group consisting of —OH, —SH,

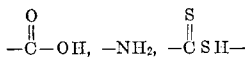

—SO₃H, —C₆H₃(OH)₂, —SO₂H, —SOH, —SeO₂H, —SiO₂H, —SnO₂H, —SbOH, —TeO₂, and —AsO₂H, and thereby producing a cured polymer having improved weather resistance properties including resistance to ultraviolet light and water deterioration.

4. The said cured polymers of improved weather resistance properties prepared according to the method of claim 3.

5. The process of claim 1 wherein in the polymerization step (a) said first monomer is butadiene and said second monomer is styrene.

6. The process of claim 3 wherein in said step (c) said organo diisocyanate is used in an amount sufficient to provide from about 18 to 22 isocyanate radicals per each 10 reactive terminal radicals of said hydrogenated liquid high alkyl-branched telechelic polymer.

7. The process of claim 6 wherein said curing agent is used in an amount in the range of from about 0.001 to 5 weight percent of the weight of said isocyanate terminated hydrogenated liquid telechelic polymer and, said curing is promoted by a catalyst selected from the group consisting of (dimethylamino)ethanol, dibutyl tin dilaurate, diazobicyclooctane, stannous acetate, stannous octoate, lead propionate, and antimony stearate.

8. The process of claim 1 wherein said first monomer is a conjugated diene wherein at least one hydrogen is substituted by one of (I) a halogen selected from the group consisting of fluorine, chlorine and bromine, and (II) a group selected from the group consisting of alkoxy and alkoxyalkyl wherein said group contains from 1 to about 8 carbon atoms.

9. The process of claim 1 wherein said second monomer is a monomer containing at least one vinyl radical and wherein at least one hydrogen is substituted by one of (I) a halogen selected from the group consisting of fluorine, chlorine, and bromine, and (II) a group selected from the group consisting of alkoxy and alkoxyalkyl wherein said group contains from 1 to about 8 carbon atoms.

10. The process of claim 9 wherein said second monomer is further characterized as a vinyl-substituted aromatic compound wherein the aromatic nucleus is further substituted with at least one group selected from the group consisting of alkyl, cycloalkyl, aryl, alkaryl, aralkyl, alkoxy, arylalkoxy, and dialkylamino, and wherein the total number of carbon atoms of the combined substituents is from about 2 to 12.

11. The process of claim 9 wherein said second monomer is further characterized as a polar monomer in which the vinyl group is attached to a carbon atom of a heterocyclic ring containing a nitrogen atom and in which the said ring further contains at least one substituent selected from the group consisting of hydrogen, alkyl, cycloalkyl, aryl, alkaryl, aralkyl, alkoxy, and arylalkoxy, and dialkylamino, in which the total number of carbon atoms in the combined substituents is from about 2 to 12.

12. The process of claim 11 wherein said polar monomer is selected from the group consisting of acrylic ester, alkacrylic acid ester, nitrile, N,N-disubstituted amides.

13. The process of claim 1 wherein said hydrogenation step (b) proceeds with a Raney nickel catalyst, a hydrogen pressure of from atmospheric to about 3,000 p.s.i.g., a temperature of from about 75° F. to 1000° F., and for a time sufficient to saturate at least about 70 percent of the olefinic double bonds of said liquid high-vinyl telechelic polymer.

References Cited
UNITED STATES PATENTS

| | | | |
|---|---|---|---|
| 2,877,212 | 3/1959 | Seligman | 260—77.5 |
| 3,135,716 | 6/1964 | Uraneck et al. | 260—85.1 X |
| 3,177,190 | 4/1965 | Hseih | 260—82.1 X |
| 3,362,921 | 1/1968 | Ehrlich et al. | 260—18 |

DONALD E. CZAJA, Primary Examiner

D. J. BARRACK, Assistant Examiner

U.S. Cl. X.R.

260—77.5 CR, 429.7, 440, 446, 448.2 B, 500.5, 502.4 R, 513 R, 606.5 P, 607 R, 609 A, 635 R, 653.1 R, 655, 690, 875

CERTIFICATE OF CORRECTION

Patent No. 3,629,172     Faber B. Jones     Dated: December 21, 1971

It is certified that error appears in the above-identified patent and that said Letters Patent are hereby corrected as shown below:

Claim 1, column 10, line 65, "$-SnO_3H$" should be ---- $-SnO_2H$ ----.

Claim 3, column 11, line 16, "$-TeO_2$" should be --- $-TeO_2H$ ----.

Claim 6, column 11, line 32 (beginning of 5th line of claim)

"high" should be --- highly ----.

Signed and sealed this 13th day of June 1972.

(SEAL)
Attest:

EDWARD M. FLETCHER, JR.
Attesting Officer

ROBERT GOTTSCHALK
Commissioner of Patents